United States Patent [19]

Beck et al.

[11] Patent Number: 4,515,683

[45] Date of Patent: May 7, 1985

[54] PASSIVATION OF VANADIUM ACCUMULATED ON CATALYTIC SOLID FLUIDIZABLE PARTICLES

[75] Inventors: H. Wayne Beck; Charles F. Lochow, Jr., both of Russell; Charles W. Nibert, Ashland, all of Ky.

[73] Assignee: Ashland Oil, Inc., Ashland, Ky.

[21] Appl. No.: 532,252

[22] Filed: Sep. 15, 1983

[51] Int. Cl.³ ............................................. C10G 11/05
[52] U.S. Cl. ................................ 208/113; 208/52 CT; 208/120
[58] Field of Search .......... 208/113, 120, 127, 52 CT; 502/41, 521, 73, 65, 303

[56] References Cited

U.S. PATENT DOCUMENTS

| | | | |
|---|---|---|---|
| 3,816,342 | 6/1974 | Plank et al. | 208/120 X |
| 4,097,410 | 6/1978 | Gladrow | 502/65 |
| 4,147,613 | 4/1979 | Gladrow | 208/120 |
| 4,187,199 | 2/1980 | Csicsery | 502/73 |
| 4,208,269 | 6/1980 | Gladrow et al. | 208/120 |
| 4,263,174 | 4/1982 | Tu et al. | 208/120 |
| 4,268,376 | 5/1981 | Foster | 208/120 |
| 4,287,048 | 9/1981 | Gladrow et al. | 208/120 |
| 4,289,606 | 9/1981 | Gladrow et al. | 208/120 |
| 4,292,169 | 9/1981 | Gladrow | 208/120 |
| 4,299,688 | 11/1982 | Tu et al. | 208/120 |
| 4,308,129 | 12/1981 | Gladrow et al. | 208/120 |
| 4,311,581 | 1/1982 | Baron et al. | 208/115 |
| 4,312,744 | 1/1982 | Tu et al. | 208/120 |
| 4,376,039 | 3/1983 | Gladrow et al. | 208/120 |

*Primary Examiner*—Delbert E. Gantz
*Assistant Examiner*—O. Chaudhuri
*Attorney, Agent, or Firm*—Richard C. Willson, Jr.; C. William Crady

[57] ABSTRACT

Passivation of vanadium accumulated on catalyst, e.g. crystalline zeolite hydrocarbon conversion catalyst in the rare earth and/or ammonia exchanged zeolite form, effectively minimizes the degrading characteristics of accumulated vanadium on the catalyst. The passivation is accomplished by impregnating or, preferable, precipitating, rare earths, e.g. lanthanum, onto the catalyst particles before and/or after vanadium accumulation. The process is also applicable to inert sorbent particles, e.g. those used for removing carbon and metals from contaminated hydrocarbons.

8 Claims, 5 Drawing Figures

FIG. 2
CRYSTALLINITY Vs. SURFACE AREA

FIG. 3
ZEOLITE INTENSITY Vs. VANADIUM CONTENT
CIS TEST

PASSIVATION OF VANADIUM ACCUMULATED ON CATALYTIC SOLID FLUIDIZABLE PARTICLES

CROSS REFERENCES TO RELATED APPLICATIONS

Metals deposition on catalytic materials has been a recognized problem in petroleum processing, especially fluid catalytic cracking. Initially, Ni was the worst contaminant metal and vanadium to a much lesser extent. However, with the advent of processing heavier feeds such as heavy residual oils and reduced crude, the roles have switched with vanadium as vanadia pentoxide becoming the worst catalyst contaminant metal. This phenomena has been recognized in many co-pending applications and patents issued to Ashland Oil, Inc.

Vanadia under proper conditions of valence (+5), steam and oxygen atmospheres can transfer or flow within a catalyst particle and from catalyst particle to catalyst particle by melting and/or vaporization. Vanadia flow can be controlled by controlling its valence state e.g. by using reducing atmospheres as described in U.S. Ser. No. 06/255,931 and U.S. Pat. No. 4,377,470 to Hettinger et al. Vanadia transfer or flow can be also halted through immobilization by the addition of additives as disclosed in co-pending applications U.S. Ser. No. 06/277,752 and U.S. Pat. No. 4,432,890 and by trapping with select materials as described in U.S. Ser. No. 06/252,967. Vanadium and sodium can be effectively immobilized by conversion to high melting compounds such as by treatment of the total feed with an immobilization agent disclosed in U.S. Pat. No. 4,437,981.

BACKGROUND OF THE INVENTION

1. Field of the Invention

The present invention relates to the immobilization of metal-contaminated particulate matter, particularly to catalyst used in the removal of metals from contaminated hydrocarbons.

2. Description of the Prior Art

A good deal of work by Gladrow and associates relates to the field of hydrocarbon conversion and particularly to metal-contaminated catalyst: U.S. Pat. Nos. 4,287,048, 4,289,606, 4,308,129, 4,292,169, 4,147,613, 4,097,410 and 4,376,039 also several patents to TU and associates have been issued for developing techniques for dealing with accumulations of metals: U.S. Pat. Nos. 4,299,688, 4,263,174 and 4,312,744. Most of the above patents are classified in US class 208, subclass 120 and class 502 subclass 455Z.

Sorbent materials for removing metals from catalyst have been taught by Yan; U.S. Pat. No. 4,334,976 and by Bartholic U.S. Pat. Nos. 4,243,514, 4,309,274, and 4,328,891. These are generally classified in U.S. Patent class 208 subclass 91.

Various patents have taught a variety of catalytic cracking catalysts for the use with hydrocarbons including U.S. Pat. No. 4,208,269 to Gladrow and U.S. Pat. No. 4,137,152 to Chester and many others.

Most of the prior art which have been issued prior to 1975 has been concerned with the cracking of virgin gas oils e.g. in a fluid catalytic cracking (FCC) apparatus. In such operations nickel has been considered the principally deleterious metal contaminant and the term "nickel equivalence" has been calculated as:

Ni equivalents = 4Ni + V + Fe or

Ni equivalent = Ni $\times$ V/4 $\times$ Fe/5

As the use of more contaminated distress feedstocks e.g. reduced crude oils became necessary due to the increasing cost of petroleum feedstocks, the present inventors and others recognized vanadium as being probably the most deleterious of all metal contaminants, particularly its effect on zeolite structures contained in cracking catalyst and also its affect on agglomeration and plugging of sorbents used for demetalizing feedstocks.

Therefore, the present invention is concerned with the non-ionic deposition of lanthanum and/or lanthanum rich rare earths onto the particulate matter e.g. catalyst, which is contaminated with (or will be contaminated with) vanadium and/or other heavy metal contaminants. The non-ionic deposition of lanthanum rich material may occur prior to, during or after vanadium contamination and is preferably accomplished by physical means, such as by precipitating the lanthanum rich rare earths onto formed particulate matter.

UTILITY OF THE INVENTION

The invention is useful for a wide variety of hydrocarbon and other chemical conversion processes but is particularly preferred for effecting the conversion of gas oils and higher boiling hydrocarbon feedstocks such as residual oils or reduced crudes contaminated with metals and carbon producing materials.

SUMMARY OF THE INVENTION

According to the present invention, the deleterious effect of vanadium contaminant and to some extent that of other metal contaminants, can be reduced substantially by the addition of rare earths such as lanthanum by non-ionic deposition. "Non-ionic deposition" as used herein, means physical deposition onto the particles of catalyst precipitating the rare earths onto the particles.

Surprisingly, merely including lanthanum in the catalyst e.g. by exchanging rare earths onto the zeolite of a catalyst, does not provide as effective a passivation or other control of the deleterious effect of vanadium on the particulate matter.

The invention is concerned with converting carbo-metallic containing oil feeds with catalysts suitable for converting or decontaminating hydrocarbons such as gas oil feeds, reduced crudes, residual oils, topped crudes and vacuum gas oils, comprising materials boiling above about 316° C. (about 600° F.) and residue material boiling in excess of 552° C. (1025° F.) to form liquid transportation fuels. A preferred group of catalysts of this invention comprise active crystalline zeolite stabilized by rare earth and/or ammonia exchange (ionic) and dispersed in a matrix material of desired activity selected to implement liquid and gasiform material diffusion contact with active zeolite sites in the catalyst composition. A high pore volume matrix of relatively large pore size material, provided with and-/or without acidic cracking activity is preferred. Preferably the catalyst is prepared to provide at least some acidic cracking activity for effecting catalytic cracking of the higher boiling liquid components of the high boiling feed. More particularly the matrix material of large pore size and high pore volume comprising one or more inorganic oxides and clay type materials accumulate metals deposited upon converting the high boiling feed. The matrix material may also contain one or more of alumina, titania, and zirconia for improving immobilization or trapping of deposited metal contaminants at temperatures encountered in a hydrocarbon conversion process such as the regeneration section thereof.

The catalysts utilized in a more conventional relatively clean gas oil feed fluid catalytic cracking (FCC) operation are generally prepared to contain less than 40 wt % zeolite. The fact that these known catalysts may be used to crack higher boiling component residual oils and reduce crudes in a short on stream time riser operation does not mean that the clean gas oil catalysts are suitable for processing liquid carbo-metallic containing heavy oil feeds contributing materials such as asphaltenes, polynuclear aromatics, polar compounds, naphthenes and porphyrins found particularly in the resid portion of vacuum distillation and boiling above 552° C. (1025° F.) or more usually above 566° C. (1050° F.).

It has been observed that the prior art catalysts comprise a high cerium to lanthanum ratio rare earth exchanged crystalline zeolite dispersed in an inorganic oxide matrix material of low pore volume, usually not above about 0.22 cc/gm; and comprising pore size openings of less than 500 angstroms. The matrix of these catalysts also sometimes contains a binder material of little or no acidic cracking activity.

FEEDS

The processing of gas oils (atmospheric and vacuum) boiling below about 552° C. (about 1025° F.) with crystalline zeolites containing cracking catalysts has been available to the petroleum refiner since the early 1960's and used considerably in the 1970's. Generally such gas oil feeds are relatively low in metal contaminants and Conradson carbon value because of the feed purity sources selected. In addition, high sulfur or sour crudes and those comprising high levels of metal contaminants were not used in these early FCC operations unless severe treating processes were utilized just to remove or substantially reduce these undesired components. Such severe processes include hydrogenation, propane deasphalting, coking, hydrocracking, visbreaking and vacuum distillation. These processes are considered relatively expensive and considerably reduce the volume of the crude oil barrel upgraded to transportation liquid fuels.

The catalysts developed for gas oil FCC processing have been developed to provide a relatively high conversion and high selectivity to particularly gasoline boiling range products and light cycle oils since higher boiling product material is normally recycled to the cracking operation. In this gas oil processing environment, the deposition of metals is relatively low because of feed composition. The Conradson carbon level thereof is generally below about 1 wt % and more usually carbon deposition is within the range of 4-5 wt % based on feed. The feeds used in such gas oil operations are readily vaporized at the cracking reaction conditions and thus deposition of large amounts of coke forming materials and metal contaminants on the catalyst is not the norm. In FCC gas oil cracking operations, diffusion of the gas oil feed with the fluid catalyst particle is not a major problem and pore blockage by excessive metal deposition is much less of a problem than when processing higher boiling liquid hydrocarbons of high coke and metal deposition. Since deposition of undesired metal components and carbon is normally of a low order of magnitude in gas oil FCC operations, there has been less need to provide a matrix material particularly designed to accumulate metals and passivate their undesired characteristics to the exclusion of substantially disturbing the catalyst cracking activity and hydrocarbon conversion desired. Furthermore, and much more importantly, there has been little recognition by others of the need to particularly immobilize vanadia (vanadium pentoxide) because the level of deposition of vanadia encountered in a clean gas oil cracking operation does not trigger recognition of particle sintering, zeolite destruction coalescence and other undesired characteristics due to liquefaction and flow of vanadia at regeneration temperature conditions in the range of 704° to 871° C. (1300° to 1600° F.).

In contrast to the clean gas oil FCC operation, a reduced crude or a residual oil conversion operation processing poor quality feeds which have not been subjected to vacuum distillation, propane deasphalting and other contaminant removal processes, contain high levels of metal contaminants, sulfur and nitrogen compounds and multi-ring components contributing to a high Conradson carbon value. A carbo-metallic containing heavy oil feed is particularly representative of poor quality feeds available to the refiner today.

PRIOR PROBLEMS

A crystalline zeolite conversion catalyst utilized in a reduced crude conversion process is rapidly deactivated by metal contaminants and high carbon deposits which can be corrected to some extent by using high catalyst replacement rates contributing to a highly unattractive economic operation. The rapid deactivation of a crystalline zeolite containing catalyst in such contaminated feed operations is due to a rapid loss of the zeolite structure, activity and selectivity by metals deposition. The crystalline zeolite catalysts have a hydrothermal stability problem for handling high levels of carbonaceous material deposition contributing to high temperature regeneration thereof. It has been observed that high temperature regeneration in the presence of steam and especially vanadium and oxygen, rapidly destroys the activity of the zeolite cracking component of the catalyst. This condition is aggravated by using a low silica-alumina ratio, sodium containing zeolite in conjunction with high metals deposition comprising vanadium, sodium, nickel and iron leading to rapid zeolite cracking activity neutralization. In addition the activity of the zeolite catalyst is rapidly affected by deposition of heavy high boiling hydrocarbons found in reduced crudes that are not vaporized and such materials rapidly coat the catalyst particles with a tacky liquid material also causing particle coalescence and agglomeration because of deposited materials such as a asphaltenes in the feed. Furthermore, the sorbed heavy hydrocarbons contribute to pore blockage, both in the matrix, and especially the zeolite pores, aggravate diffusion problems because of low pore volume, and effect acid site neutralization by adsorption of basic nitrogen compounds in the high boiling reduced crude feed.

The problems above discussed with respect to cracking catalyst activity, acidity, hydrothermal stability, diffusion and pore blockage, sodium content of the zeolite component, acid site neutralization, metals accumulation and vanadia immobilization are reduced or circumvented in substantial measure by employing the special concepts of this invention.

The present invention is concerned with a unique combination for maintaining the activity and selectivity of a zeolite containing catalyst or the sorbent characteristics of sorbent compositions.

Preferred catalyst compositions herein identified are particularly suitable for effecting the conversion of one or more high boiling feeds comprising gas oils, gas oils comprising components boiling above about 552° C. (about 1025° F.), reduced crudes, topped crudes, residual oils, shale oils, oil products from coal liquefaction, tar sands oil products and resids all of which comprise one or more carbo-metallic oil components in the form of free metals, asphaltenes, refractory aromatic and polar compounds, naphthenes and porphyrins. The catalysts herein identified are useful for processing Conradson carbon producing feed materials in the range of 2 to 10 Conradson carbon and comprising up to 75 ppm or more of vanadium. The catalyst compositions of this invention are particularly useful for processing the high boiling feeds above identified when carrying an accumulated metals level of Ni+V in excess of 2000 ppm, preferably from 5,000 up to about 15,000 ppm of said metals of which vanadium is in a major proportion. In yet a further aspect, the present invention is concerned with providing an improved metals tolerant catalyst composition of sustained relatively high cracking activity whereby the catalyst particles service is extended and the catalyst inventory of the processing system is kept at a desired low level of magnitude contributing significantly to the economic efficiency of a reduced crude cracking operation. The provision for low catalyst inventories is desirable since it permits reducing the size of costly regeneration equipment, reduces the relative time a high vanadium containing catalyst is exposed to time and temperature in a regenerator operation relative to the time it is engaged in riser cracking. The longer the time that a high vanadium containing catalyst is at high temperature in the presence of steam and $O_2$ has been found to be very detrimental to catalyst life in the absence of passivation thereof. Low catalyst inventories reduce catalyst makeup inventory for maintaining a predetermined and desired catalyst activity-selectivity characterization in a circulating catalyst system comprising hydrocarbon conversion to form desired products and regeneration of catalyst used in such an operation.

CONVERSION PROCESS

The high boiling reduced crude conversion operation contemplated by this invention relies upon a maintained catalyst inventory which will permit the use of catalyst to oil feed ratios in the range of 5-20 to 1 in a short contact time temperature restricted cracking zone such as attained in a riser cracking zone. Also of low or restricted inventory is an associated catalyst stripping zone and interconnecting catalyst transfer zones in combination with a catalyst regeneration operation comprising one or more and preferably at least two stages of catalyst regeneration in sequence to achieve a desired temperature controlled removal of deposited hydrocarbonaceous materials. Thus by providing a catalyst composition which will accept a greater metals accumulation at desired sustained activity and selectivity thereby permits a longer on stream operating life with a higher activity-equilibrium metals level catalyst which will greatly reduce catalyst replacement rate and thus improve the process operating efficiency.

CATALYSTS

The improved high activity metals tolerant catalysts preferred in this invention are crystalline zeolite containing particle compositions of fluidizable particulate size in the range of 20 to 200 microns size comprising a low or higher activity crystalline aluminosilicate of large pore size dimensions, and ion exchanged to provide an ultrastable crystalline zeolite or a lanthanum rich rare earth exchanged zeolite and preferably provide a lanthanum rich crystalline zeolite of low residual sodium, less than 0.25 wt % in the finished catalyst. Preferably a crystalline zeolite of less than 1.0 wt % sodium oxide is dispersed in a special matrix composition comprising clay which may provide some cracking activity with or without acidic modifiers and dispersed in a silica or silica-alumina inorganic oxide matrix of gelaceous or colloidal ancestry. The catalyst is prepared under conditions to provide a pore volume preferably at least about 0.32 cc/g. A catalyst particle with a pore volume of at least 0.4 cc/g and higher is particularly more desirable. The crystalline zeolite is prepared in combination with a binder material initially comprising one or more refractory metal oxides providing desired hardness in the final microspherical particle. The refractory metal oxide or oxides suitable for this purpose may be selected from the group consisting of silica, alumina, silica-alumina, silica-magnesia, silica-alumina-magnesia, silica-titania, silica-zirconia, titania, zirconia and mixtures and combinations thereof.

ZEOLITES

Zeolites or crystalline aluminosilicates (CAS) of acceptable pore dimensions and particle size suitable for the preparation of cracking catalyst composition are micron size, three dimensional structures containing a large number of uniform openings or cavities interconnected by smaller, relatively uniform holes or channels.

Some zeolites which may be used with varying degrees of success include mordenite, gmelinite, zeolite "L", ZSM 4, faujasite and dealuminized faujasite of at least 5.5/1 silica to alumina ratio. A "Y" type crystalline faujasite is particularly preferred in preparing the catalyst of this invention. Some characteristics of these crystalline zeolite are as follows:

| Summary of Some Zeolite Pore Sizes | | | |
|---|---|---|---|
| | Pore Dimensions | Pore Free Area ($A^2$) | Si/Al Ratio |
| Faujasite | 7.4 × 7.4 | 55.0 | 2.8 |
| ZSM4 | 7.3 × 7.3 | 53.5 | 2.1 |
| "L" | 7.1 × 7.1 | 50.5 | 3.6 |
| Gmelinite | 7.0 × 7.0 | 49.0 | 2.5 |
| Mordenite | 6.7 × 7.0 | 46.8 | 6.0 |

The preferred zeolite for preparing the metals tolerant catalyst of this invention is in a particular embodiment a catalytically active faujasite crystalline zeolite providing a silica to alumia ratio greater than 5 which has been ion exchanged several times before and after calcination to include hydrogen ions and/or lanthanum rich rare earth ions. A particularly preferred catalyst is one that provides a lanthanum to cerium ratio of at least 1/1 and preferably at least 2/1:La/Ce or more in the zeolite structure. It is known that a crystalline zeolite stability is directly proportional to the lanthanum or neodymium content and inversely proportional to the cerimum content. The faujasite type zeolites known as "X" and "Y" crystalline zeolites are regularly shaped, discrete particles generally of a particle size in the range of 0.05 to 10 microns, preferably less than 5 microns when synthetically prepared and used in the catalyst preparation concepts of this invention. The especially preferred zeolite is the "Y" type crystalline zeolite, and the higher the silica to alumina ratio, the better its stability. Generally speaking, the preferred "Y" zeolite will contain a silica-alumina ratio of at least 4.5 or greater, more usually one containing a 5/1 silica to alumina ratio and preferably at least 5.5 to 1 silica to alumina molar ratio.

The zeolites are catalytically activated and stabilized by ion exchange to replace sodium to a desired low level with hydrogen and/or lanthanum rich rare earth metals to provide a final catalyst particle composition comprising less than 0.25 wt % sodium oxide. The removal of sodium ions to a very low level and provide a rare earth exchanged "Y" faujasite characterized as herein provided is considered to be a more stable zeolite than the hydrogen form of the zeolite and this is particularly optimized by providing a high lanthanum content rare earth zeolite exchange before and after calcination of a high silica content zeolite. In particular, when dealing with vanadia, a high lanthanum content crystalline zeolite of at least 7 wt % is especially desirable. These catalytically modified rare earth containing crystalline zeolites are highly active catalytic compositions and most usually require some further modification as by high temperature steaming and dilution in a support or matrix material to restrict the overall catalyst particles activity thereof within acceptable catalytic cracking limits.

In the prior art, catalyst compositions have been prepared so that the matrix comprises silica, alumina or mixtures thereof comprising at least 25 wt % alumina and more usually at least 50 wt % alumina. The matrix material is also known to comprise a clay in an amount of about 10 to 65 wt % of the finished catalyst. Clays such as kaolin, halloysite, montmorillonite and others have been used in the prior art. Also heat and chemically modified clays such as metakaolin and acid treated halloysite can be used. On the other hand, a colloidal dispersion of silica and/or alumina particles (10 to 10,000 A) may be added to a preformed catalyst or catalyst gel to provide a catalyst composition of improved resistance to metal poisoning, as in U.S. Pat. No. 4,198,320. Furthermore U.S. Pat. No. 3,944,482 proposes cracking of a high metals content hydrocarbon feedstock in the presence of a catalyst comprising from 1 to 40 wt % of a zeolite dispersed in a refractory metal oxide matrix providing a pore size distribution in the range of 50-100 Angstroms. U.S. Pat. Nos. 3,972,835; 3,957,689 and 3,867,308 prepare catalysts by neutralizing silicates by adjusting their pH and then adding clay and zeolites to form cracking catalyst.

The improved metal tolerant catalysts of this invention are of a composition comprising at least about 5 wt %, more preferably about 7-40% and most preferably 10-30 wt % of a select lanthanum rich crystalline zeolite of small particle size in the range of about 0.05 to 5 microns particle size dispersed in a gel or colloidal suspension of silica, alumina or a combination thereof to form a matrix material providing a desired intimacy of admixture with the small particles of high lanthanum to cerium ratio crystalline zeolite. Preferably a kaolinite clay characterized by a small particle size of about 1 micron size, more or less and providing a pore volume in the catalyst particle complex in excess of 0.30 cc/g is selected. It is preferred that the pore volume be at least 0.32 cc/g, greater than 0.35 cc/g and more desirably in the range of 0.4 to 0.6 cc/g.

EFFECT OF METAL CONTAMINANTS

The known literature and prior patent art, teach that metals, such as Ni, V, Fe, Cu and Na are deposited on a cracking catalyst when processing reduced crudes. Of all these metals, which effect catalyst activity and selectivity, sodium was particularly emphasized as affecting activity.

To catalyst compositions most suitable for converting reduced crudes in the presence of large amounts of metal deposits, vanadium is now considered the most destructive of the metal contaminant, followed by sodium. Nickel appears to be the least destructive. Vanadia, as vanadium pentoxide, causes irreversable destruction of a crystalline zeolite structure, rapidly producing a much lower activity material of or approaching amorphous nature. Sodium does lead to permanent neutralization of the zeolite acid cracking sites. Nickel leads primarily to temporary neutralization of the cracking sites by promoting dehydrogenation and deposition of carbonaceous materials.

In arriving at the concepts expressed herein, different concentrations of Ni, V and Na were utilized by impregnating several catalyst mixtures to study the effect of these metals on steamed equilibrium catalysts. The results obtained are reported below in Table A on the basis of 0.5 wt % metal reducing the relative activity of each catalyst mixture. That is, 0.5 wt % nickel reduces the conversion level 5–15%, 0.5 wt % vanadium reduces the conversion level 60–100% and 0.5 wt % sodium reduces the conversion level approximately 50–60%. This reduction value is a percentage of the total conversion or a relative value.

TABLE A

| | % REDUCTION IN RELATIVE ACTIVITY | | | |
|---|---|---|---|---|
| | Super DX 10% Zeolite | GRZ-1 40% Zeolite | X-1966 25% Zeolite | Factor |
| 0.5% Ni | 15 | 7 | 5 | 9 |
| 0.5% V | 100 | 60 | 62 | 87 |
| 0.5% Na | 50 | 50 | 60 | 53 |

It is thus noted that in terms of catalyst destruction, nickel and vanadium reverse roles and sodium becomes important as against the selectivity emphasis expressed in the "Ni equivalents" equation of former patents and articles.

HYDROCARBON CONVERSION PROCESSES

This invention may be employed in a number of different apparatus arrangements known in the art or yet to be divised which permits achieving low reactant vapor residence time less than 3 seconds and more usually in the range of 0.5 to 2 seconds between a hydrocarbon feed, vaporous conversion products and catalyst particles at tempertures providing desired catalytic hydrocarbon cracking or conversion of the heavy oil feed to more useful products. The product vapors are recovered at a temperature within the range of 510° C. to 621° C. (950° F. to 1150° F.) but more usually below about 593° C. (about 1100° F.). In cooperation with the hydrocarbon conversion operation is a regeneration system or operation designed to restrict catalyst regeneration time and temperatures below 815° C. (1500° F.) and more usually below 760° C. (1400° F.) so as to produce a recoverable flue gas rich in $CO_2$ or as a CO rich flue gas. The catalyst regeneration operation is designed to provide a regenerated catalyst of low residual carbon content and preferably less than 0.1 wt %. In a more particular aspect it is preferred employing at least two stages of temperature restricted catalyst regeneration operations in combination with one or more catalyst stripping operations which will operate in conjunction with one another to reduce the exothermic temperature rise encountered during the removal of relatively large deposit of hydrocarbonaceous materials and some metal contaminants contributed by cracking reduced crudes. More particularly a two stage oxygen containing gas regeneration operation is contemplated or one stage thereof may be replaced by using $CO_2$ to remove hydrocarbonaceous component material in combination with a relatively high temperature stripping operation to remove hydrogen, sulfur and nitrogen. In this catalyst regeneration operation and sequence of temperature restricted contact steps, it is contemplated in one particular embodiment of relying upon high temperature $CO_2$ to remove some hydrogen and some cabonaceous deposits in one or more stages of catalyst regeneration and such an operation may be intercepted by oxygen combustion removal of a portion of the deposited carbonaceous material by burning to produce a CO or $CO_2$ rich flue gas recovered from the operation. In any of these regeneration combinations it is particularly desirable to restrict the temperatures of oxygen combusion to relatively low levels, preferably below about 787° C. (about 1450° F.), which will provide recoverable CO rich or $CO_2$ rich flue gases. Removing hydrogen in hydrocarbonaceous deposits with $CO_2$ as well as carbon to produce recoverable CO improves measurably the overall heat balance of the combination operation and reduces potential temperature excursion changes to the catalyst under elevated temperature hydrothermal conditions.

DISCUSSION OF SPECIFIC EMBODIMENTS

The invention is concerned with the passivation of deleterious metal contaminants accumulated on fluidizable solid particle materials and particularly crystalline zeolite containing cracking catalyst. More particularly, the invention is concerned with the passivation of vanadium accumulated on fluid solid particles sufficient to void the defluidizing effect of low melting point vanadium oxides as well as dehydrogenation characteristics thereof during catalytic contact with relatively high boiling hydrocarbonaceous materials such as petroleum, shale oil, liquid products of coal solvation or other source of liquid carbon-hydrogen contributing materials available to the petroleum refiner for upgrading to liquid fuel products such as gasoline.

It has been found in an investigation contributing to the concepts of this invention that the enrichment of fluidizable solid particle material for and catalytic cracking by lanthanum has shown an unexpected and marked effect upon successful utilization of the solids in fluid solid contact systems and particularly crystalline aluminosilicate catalyst containing hydrocarbon conversion systems.

The enrichment of fluid solids and particularly crystalline zeolite fluid catalyst solids or particles thereof with lanthanum as herein provided effectively immobilizes the low temperature flow characteristics of vanadium and its oxides. Furthermore, it has been found that the hydrogen producing factor and the carbon producing factor of an active crystalline zeolite conversion catalyst comprising rare earth exchanged and/or ion hydrogen exchanged zeolite contaminated with vanadium and vanadium oxides by use is improved in activity and selectivity characteristics by enriching the catalyst particles with lanthanum as the vanadium content thereof increases. Thus the enrichment of fluidizable solid particles with lanthanum rich materials to provide a high La/Ce ratio substantially increases the vanadium accumulation tolerance of the solids whether catalytic and thus their on stream use life is substantially extended.

The present invention is concerned with increasing the on stream active life of crystalline zeolite catalyst compositions exposed during use to substantial contaminant metals levels of vanadium. In a more particular aspect the present invention is concerned with reducing the deactivating affects of vanadium deposits on a crystalline zeolite containing cracking catalysts whereby accumulations of vanadium substantially in excess of 2000 ppm and more usually in excess of 5000 ppm may be tolerated without experiencing prohibitive deactivation of the catalyst during heavy oil conversion producing undesired quantities of hydrogen, coke and a product selectivity markedly altered as a function of catalyst activity and surface area decline.

It has been found after some considerable experimentation that the catalytic deactivating effects of vanadium may be altered substantially by enrichment with lanthanum of the crystalline zeolite containing catalyst particles as the catalyst accumulates vanadium. It has been found further that the method by which lanthanum enrichment is achieved with the fluid catalyst particles markedly influences its hydrogen producing factor (HPF), its carbon producing factor (CPF), its surface area, its relative activity and its vanadium accumulation tolerance level in maintaining a catalyst composition of desired activity and selectivity level over an acceptable on stream operating period.

The concept of producing a high lanthanum to cerium ratio in a crystalline zeolite exchanged cracking catalyst suitable for processing residual oil feeds comprising metallo-organic compounds effectively obviates the effects of vanadium and its oxides which come in contact with the catalyst. A particularly important aspect of the concept of this invention is the finding that the performance properties of a vanadium contaminated catalyst is improved when the lanthanum is precipitated on the catalyst either during or prior to vanadium addition thereto during use in a hydrocarbon conversion system. The enrichment of a prepared catalyst composition of either an ultrastable crystalline zeolite content, a rare earth exchange crystalline zeolite or a combination thereof with a lanthanum enriched particle composition as herein provided substantially improves the cracking activity of the catalyst without unduly increasing the hydrogen producing factor thereof or its carbon producing factor. Other important advantages attributed to the concept of this invention are discussed below.

The higher oxides of vanadium, particularly vanadium pentoxide are mobile and flow over a catalyst particle surface area at catalyst regeneration temperature conditions thereby reducing its active surface area and the cracking activity of the catalyst by pore plugging. This vanadium contaminant degradation also acts as a poison by increasing the hydrogen producing characteristics of the catalyst and referred to herein as the hydrogen producing factor (HPF). Enriching the catalyst with lanthanum maintains the catalyst at a high level of cracking activity and decreases the HPF of the catalyst as more fully discussed below.

In yet another aspect, it has been found that the magnitude of benefit achieved by lanthanum enrichment addition to a prepared crystalline zeolite catalyst composition is dependent in substantial measure upon the lanthanum enrichment method used as well as the materials employed to accomplish that enrichment. Thus it has been found that enriching a given catalyst composition by precipitation rather than an exchange technique substantially improved the beneficial effect achieved. In a particular aspect it is preferred that precipitation by lanthanum rich rare earths on the prepared catalyst compositions comprising from 1 to 40 wt % of a crystalline zeolite be achieved with ammonium hydroxide or oxalic acid.

BRIEF DESCRIPTION OF THE DRAWINGS

FIG. I is a graph identifying a relationship between surface area and different levels of vanadium concentration with and without lanthanum rich rare earth precipitation.

FIG. II is a graph identifying a relationship between Surface Area and Zeolite Crystallinity steamed at different temperatures.

FIG. III is a graph identifying a relationship between zeolite intensity (% zeolite) at different vanadium levels with and without lanthanum enrichment.

FIG. IV is a graph depicting a relationship between surface area and vanadium concentrations as effected with and without lanthanum addition by exchange and precipitation.

FIG. V is a graph depicting the relationship between hydrogen producing factor (HPF) and vanadium concentrations at different levels of lanthanum enrichment.

DISCUSSION OF SPECIFIC EMBODIMENTS

One method for inducing lanthanum precipitation utilizing ammonium hydroxide on zeolite containing catalysts is as follows:

(1) A rare earth chloride/water solution is added to and mixed with an active crystalline zeolite containing catalyst composition at room temperature. The rare earth chloride solution predominantly lanthanum chloride and containing lesser amounts of one or more other rare earths comprising cerium, neodymiun and praseodymium chlorides is added by precipitation to the catalyst so that the catalyst contains an additional enrichment (0.5-1.5 wt %) of lanthanum.

(2) an ammonium hydroxide/water solution is added to the mixture of (1) above to precipitate lanthanum upon the particles of catalyst. The slurry formed is mixed for a period of time sufficient to achieve desired precipitation up to about five minutes or more as required and provide the slurry with a pH of about 10-11.

(3) The slurry formed in step (2) comprising lanthanum enriched particles of catalyst is filtered and washed with deionized water. Thereafter the washed particles are dried at a temperature of about 350° F. or other suitable elevated temperature.

A precipitated lanthanum enriched crystalline zeolite hydrocarbon conversion catalyst obtained as above described has a tolerance for vanadium which is far superior to that of catalyst particles without lanthanum enrichment. For example, in one specific embodiment, a zeolite catalyst enriched with 1.2 wt % lanthanum as above provided and subsequently contaminated to a level of 6000 ppm vanadium has a relative activity 178 units higher than the same vanadium contaminated catalyst without precipitated lanthanum enrichment. Furthermore, the (HPF) hydrogen producing factor of this catalyst with 6000 ppm vanadium is decreased from about 4.2 to about 3.0 by the 1.2 wt % of the additional enrichment of precipitated lanthanum. This change is consistent with that particularly shown in FIG. V.

On the other hand a measure of the zeolite intensity which is indicative of crystalline zeolite activity also indicates that the addition of a high lanthanum to cerium ratio rare earths by precipitation protects the zeolite component of the catalyst from deleterious vanadium effects. That is, the addition of 1.2 wt % lanthanum increased the zeolite intensity of the catalyst containing 6000 ppm vanadium from a value of 0 to 53. This suggests that the added lanthanum has effectively altered the effects of the deposited vanadium oxide and substantially restored activity to the catalyst as measured by zeolite intensity (% zeolite). This change is consistent with that shown in FIG. III.

The vanadium tolerance of the lanthanum enriched catalyst was further evaluated using the CIS test. In this test, the catalyst is calcined at 649° C. (1200° F.) for 3 hours, impregnated with vanadium naphthenate, calcined at 482° C. (900° F.) for 3 hours and steamed at 787° C. (1450° F.) for 5 hours.

The sequence of drawings presented herewith and substantially self-explanatory graphically show the several improvements in catalyst characteristics achieved by the lanthanum enrichment concepts of this invention.

FIG. I shows for example the effect of a high lanthanum to cerium rare earth addition to a zeolite catalyst by the method and concept of this invention upon catalyst surface area maintained for different levels of vanadium contamination compared with that obtained in the absence of the added lanthanum. The upper curve of high La/Ce ratio addition by precipitation dramatically maintains the surface area at a higher order of magnitude as the vanadium content of the catalyst is increased.

FIG. II for example graphically identifies a relationship between surface area and zeolite crystallinity (% zeolite) content steamed at different temperature levels. The graph shows that as the X-ray defraction (XRD) crystallinity (% zeolite) increases so also does its surface area increase.

FIG. III shows the effect of a high lanthanum to cerium addition on maintaining zeolite intensity (% zeolite component) for different levels of vanadium contamination compared with a zeolite catalyst without added rare earths. That is, with lanthanum enrichment, the zeolite intensity or active % zeolite is maintained at a high order of magnitude for different levels of vanadium contamination which is much higher than achieved in the absence of rare earth lanthanum enrichment.

FIG. IV illustrates the effect of high lanthanum to cerium ratio enrichment at two different concentrations achieved by the technique of precipitation and represented by the upper curves as compared with that accomplished by exchange represented by the bottom curve. The upper most curves show that as the lanthanum to cerium ration is increased by the technique of precipitation so also is the surface area increased for any given level of vanadium contamination. More important is the observation that as the vanadium content is increased so is the surface area greatly increased thereby supporting the concept that the vanadium is being passivated by the precipitated substantial amount of lanthanum.

FIG. V graphically depicts the effect of different levels of lanthanum to cerium enrichment upon the hydrogen producing factor (HPF) for different levels of vanadium deposition. Thus as the lanthanum enrichment over cerium is increased so also is the passivation of vanadium increased and thus the HPF thereof decreased. The data presented in this figure were obtained with a zeolite catalyst which did not contain nickel known to be a hydrogenation-dehydrogenation catalyst. Therefore, the lanthanum enrichment data presented herewith are considered completely representative of the improvements achieved by vanadium passivation.

EXAMPLES

Example 1 (Comparative)

Catalysts listed in FIGS. 1-5 which were not rare earth enriched were tested as received from the catalyst manufacturer using the CIS test method. This accelerated catalyst deactivation procedure was used to measure the vanadium resistance of each of the catalysts. It involves hydrothermally treating catalyst samples which contain vanadium at 787° C. (1450° F.) for five hours.

Example 2 (According to the Invention)

Figure 1:
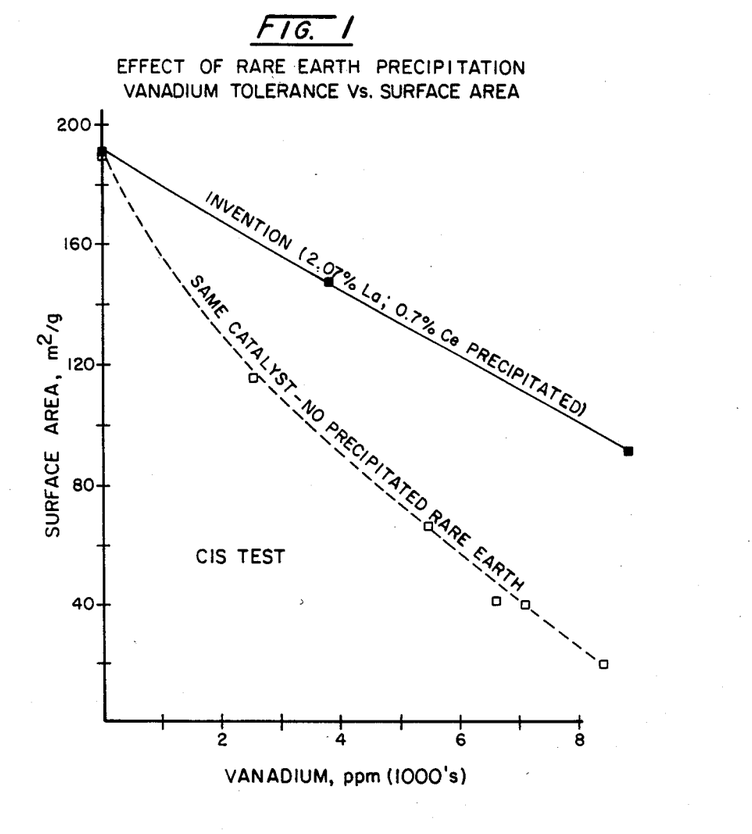
Figure 2:
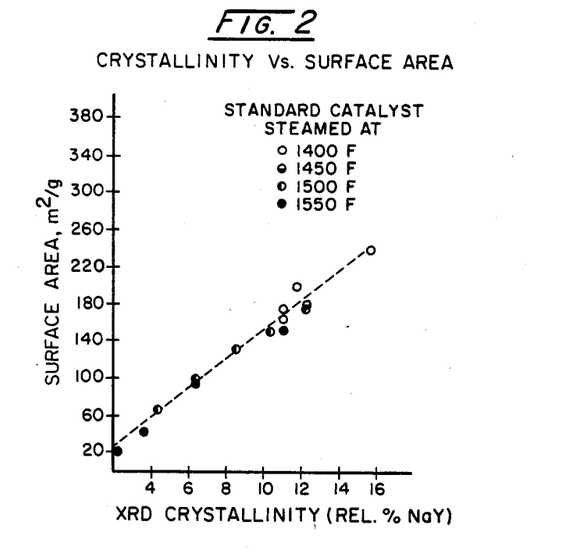
Figure 3:
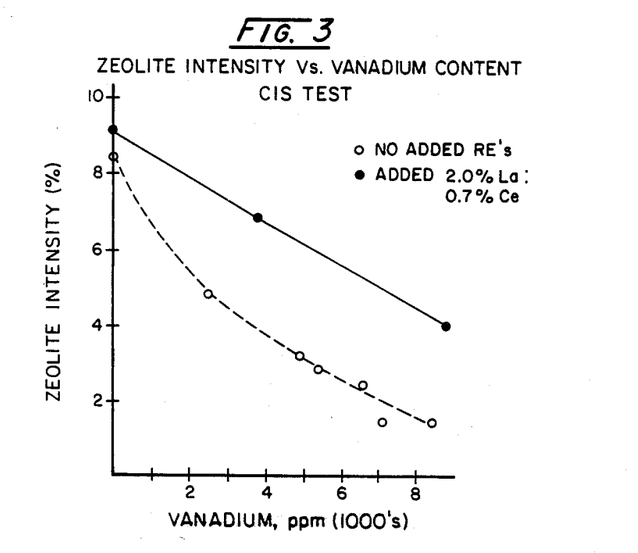
Figure 4:
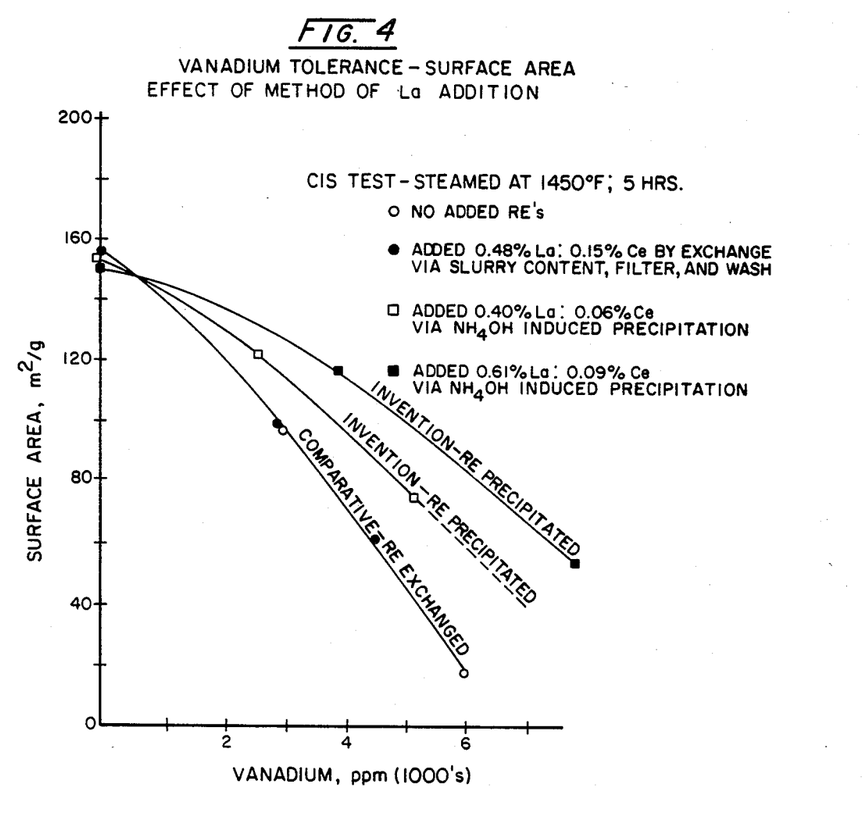
Figure 5:
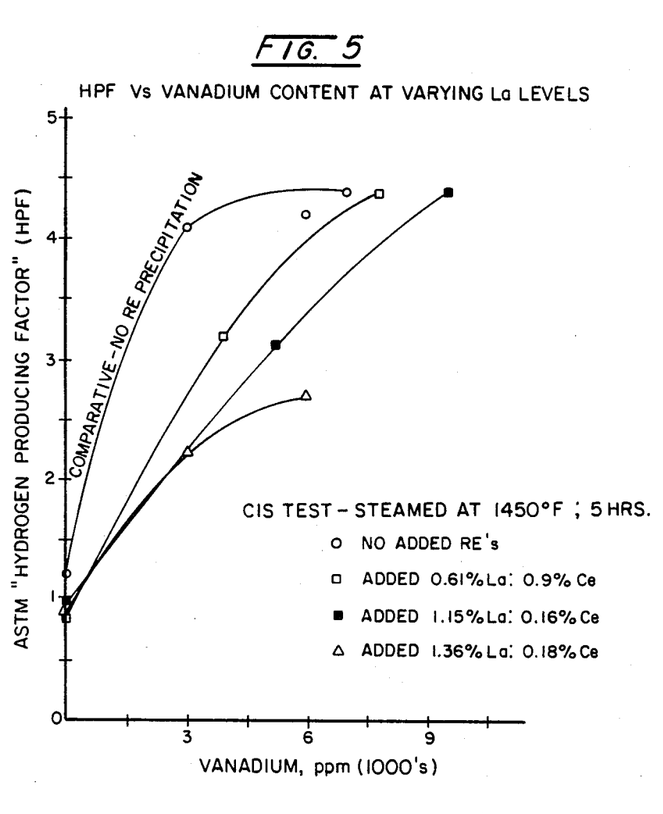

A dilute aqueous rare earth chloride solution (800 ml) was added, at room temperature, to the catalyst (1 Kg) of FIGS. 1 and 3. The wetted catalyst was slowly mixed for several minutes. Eight hundred milliliters of ammonium hydroxide solution (3.7N) were added to the wetted catalyst to precipitate the rare earths. The resultant slurry had a pH of 11. It was mixed for several minutes and filtered. The rare earth enriched catalyst was washed with 8 l. of deionized water, filtered, and dried at 177° C. (350° F.). It contained an additional 2.0% lanthanum and 0.7% cerium. The vanadium tolerance of this catalyst was measured and compared to those of the conventional catalysts described in Example 1 as shown in FIGS. 1 and 3.

Example 3 (According to the Invention)

The procedure in Example 2 was repeated to produce catalysts varying in the amount of rare earths added to the finished catalyst. Vanadium tolerance data of catalysts with an additional 0.40% La; 0.06% Ce and 0.61% La; 0.09 Ce are presented in FIGS. 4 and 5. Similar data for vanadium contaminated catalysts rare earth enriched with 1.15% La; 0.16% Ce and 1.36% La; 0.18% Ce are presented in FIG. 6.

Example 4 (According to the Invention, Precipating with Oxalic Acid)

The procedure described in Example 2 was modified to produce a catalyst which contained an additional 0.36% lanthanum and 0.10% cerium. The rare earths of this catalyst were precipated by adding 250 ml of 1% aqueous oxalic acid solution to the wetted catalyst of Example 2. The slurry had a pH of five. The remaining procedure was the same as that given in Example 2. The vanadium tolerance of a catalyst containing oxalic acid precipitated rare earths is identical to that obtained by NH4OH precipitation. The advantage of oxalic acid is that it permits rare earth precipitation at low pH (below 7).

Example 5 (Comparative, RE Ionically Exchanged)

The catalyst (1 kg) was wetted with 800 ml of deionized water at room temperature. A dilute aqueous rare earth chloride solution (300 ml) was added to the wetted catalyst at room temperature. The slurry, which had a pH of five, was stirred for twenty minutes and filtered. The catalyst was washed, filtered and dried at 350° F. It contained an additional 0.48% lanthanum and 0.01% cerium. Results from its evaluation are presented in FIG. 4 as the rare earth (RE) exchanged catalyst and demonstrates that exchange is less effective than precipitation.

MODIFICATIONS

It will be understood by those skilled in the art that the invention is not to be limited by the above examples and discussions and that the examples are susceptible to a wide number of modifications and variations with departure from the invention.

All of the references and applications cited above and the art cited therein are hereby incorporated by reference into this application.

What is claimed is:

1. In a process for catalytic cracking of hydrocarbon feed materials boiling above about 316° C. (600° F.) comprising vanadium contaminants with fluidizable particle material and wherein regeneration of the particle material to remove hydrocarbonaceous deposits by combustion converts deposited vanadium to low melting oxides whereby the oxides of vanadium flow across the particle material surface causing pore plugging and agglomeration of fluid particle material beyond fluidization capability, the improvement for passivating deposited vanadium to reduce its degrading characteristics which comprises nonionic deposition of lanthanum or lanthanum-rich rare earths on said particle in an amount sufficient to passivate deposited vanadium prior to or during contact between said particle material and said feed material.

2. The process of claim 1 wherein said nonionic deposition is accomplished by precipitation with ammonium hydroxide.

3. The process of claim 1 wherein said nonionic deposition is accomplished by precipitation with oxalic acid.

4. A method for passivating vanadium pentoxide accumulated on a circulating crystalline zeolite catalyst during catalytic conversion of oils comprising carbometallic contaminants which comprises, precipitating lanthanum on said crystalline zeolite catalyst during circulation in an amount sufficient to passivate at least 5,000 ppm of accumulated vanadium.

5. A method for extending the useful on-stream life of fluidizable solid particle material employed in catalytic conversion operations during accumulation of vanadium and oxides thereof which comprises:
  (a) nonionically enriching said fluidizable solid particle material with a quantity of said lanthanum-rich rare earths in an amount sufficient to passivate accumulated vanadium to decrease the hydrogen producing factor thereof and its high temperature flow characteristics:
  (b) Said lanthanum enrichment of the solid particles comprising vanadium being accomplished by precipitation of lanthanum with ammonium hydroxide or oxalic acid.

6. In a process for catalytically converting portions of crude oil boiling above 343° C. (650° F.) comprising vanadium metal contaminant with crystalline zeolite containing catalyst particles under conditions to deposit hydrocarbonaceous material of conversion and vanadium and wherein said catalyst is regenerated by combustion of hydrocarbonaceous deposits thereby changing vanadium deposits to low melting point oxides at regeneration temperature conditions, the improvement which comprises passivating deposited vanadium on said catalyst with rare earths rich in lanthanum, by lanthanum enrichment of catalyst particles accomplished by precipitation in an amount sufficient for the catalyst to tolerate vanadium deposits above 2000 ppm and maintain the surface area thereof greater than 60 $m^2/g$.

7. The process of claim 6 wherein the catalyst zeolite intensity is maintained above 4% with a vanadium accumulation of at least 6000 ppm.

8. The process of claim 6 wherein enrichment of the catalyst particles with precipitated lanthanum at a vanadium accumulation level of at least 6000 ppm is accomplished with oxalic acid to provide a surface area greater than 80 $m^2/g$.

* * * * *